(12) United States Patent
Eberlein et al.

(10) Patent No.: US 11,934,926 B2
(45) Date of Patent: *Mar. 19, 2024

(54) SENSITIVITY IN SUPERVISED MACHINE LEARNING WITH EXPERIENCE DATA

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,097

(22) Filed: Oct. 19, 2022

(65) Prior Publication Data

US 2023/0041514 A1 Feb. 9, 2023

Related U.S. Application Data

(63) Continuation of application No. 16/552,088, filed on Aug. 27, 2019, now Pat. No. 11,481,676.

(51) Int. Cl.
*G06N 20/00* (2019.01)
*G06F 9/451* (2018.01)
*G06F 11/34* (2006.01)
*G06F 16/904* (2019.01)
*G06Q 10/0639* (2023.01)
*G06Q 30/0601* (2023.01)

(52) U.S. Cl.
CPC ............ *G06N 20/00* (2019.01); *G06F 9/451* (2018.02); *G06F 11/3466* (2013.01); *G06F 16/904* (2019.01); *G06Q 10/06393* (2013.01); *G06Q 30/0631* (2013.01)

(58) Field of Classification Search
None
See application file for complete search history.

(56) References Cited

U.S. PATENT DOCUMENTS

| 7,856,380 | B1 | 12/2010 | Latin-stoermer et al. |
| 9,798,450 | B1 | 10/2017 | Urasaki et al. |
| 11,010,697 | B1 | 5/2021 | Liu et al. |
| 2014/0298194 | A1 | 10/2014 | Prasad et al. |
| 2016/0103588 | A1 | 4/2016 | Adarraga |
| 2018/0188906 | A1 | 7/2018 | Carter |
| 2019/0050454 | A1 | 2/2019 | Orad et al. |

(Continued)

OTHER PUBLICATIONS

"U.S. Appl. No. 16/552,088, Examiner Interview Summary dated May 10, 2022", 2 pgs.

(Continued)

*Primary Examiner* — Ryan Barrett
(74) *Attorney, Agent, or Firm* — SCHWEGMAN LUNDBERG & WOESSNER, P.A.

(57) ABSTRACT

In an example embodiment, a process is introduced into a machine learned model where additional results are output by the machine learned model in addition to those results that would be obtained through use of the trained model itself. In some example embodiments, these additional results may be random or semi-random to introduce results that might otherwise not have been recommended by the machine learned model. By introducing such additional results in a controlled way, it becomes possible to reduce biases caused by a self-reinforcing feedback loop while still presenting users with accurate machine learned model results.

20 Claims, 6 Drawing Sheets

(56) References Cited

U.S. PATENT DOCUMENTS

| | | | |
|---|---|---|---|
| 2020/0125240 A1 | 4/2020 | Wolfe et al. | |
| 2020/0210867 A1 | 7/2020 | Banis et al. | |
| 2020/0320429 A1 | 10/2020 | Jha et al. | |
| 2020/0410324 A1* | 12/2020 | Trim | G06F 16/9024 |
| 2020/0410390 A1 | 12/2020 | Fu et al. | |
| 2021/0065040 A1 | 3/2021 | Eberlein et al. | |
| 2021/0073833 A1* | 3/2021 | Manco | B33Y 50/02 |
| 2021/0081841 A1 | 3/2021 | Sikka et al. | |
| 2021/0241167 A1 | 8/2021 | Li et al. | |
| 2023/0041514 A1* | 2/2023 | Eberlein | G06F 9/451 |
| 2023/0188374 A1* | 6/2023 | Zhuk | G06N 3/045 |
| | | | 709/206 |
| 2023/0206086 A1* | 6/2023 | Shwartz | G06N 5/022 |
| | | | 706/46 |

OTHER PUBLICATIONS

"U.S. Appl. No. 16/552,088, Non Final Office Action dated Mar. 23, 2022", 29 pgs.

"U.S. Appl. No. 16/552,088, Notice of Allowance dated Jun. 24, 2022", 8 pgs.

"U.S. Appl. No. 16/552,088, Response filed May 20, 2022 to Non Final Office Action dated Mar. 23, 2022", 9 pgs.

Rohler, "The Magical <iframe> Tag: An Introduction", <https://web.archive.org/web/20180809001150/https://www.dwuser.com/education/content/the-magical-iframe-tag-an-introduction/>, (Aug. 9, 2018).

* cited by examiner

SENSITIVITY IN SUPERVISED MACHINE LEARNING WITH EXPERIENCE DATA

CROSS-REFERENCE TO RELATED APPLICATIONS

This application is a continuation of prior application Ser. No. 16/552,088, filed on Aug. 27, 2019, which is incorporated by reference herein in its entirety.

TECHNICAL FIELD

This document generally relates to systems and methods for use in machine learning. More specifically, this document relates to improving sensitivity in supervised machine learning with experience data.

BACKGROUND

In the era of Enterprise application and "the Intelligent Enterprise", the usage of machine learning has become a point of differentiation in product offerings. Machine learning is utilized in a variety of different ways for such product offerings, most commonly being used to provide recommendations (e.g., product recommendations).

The quality of machine learned models used in products is therefore critical for the success of a product. If a machine learned model is used in a product but does not give superior results, or at least does not give results that are significantly better than current approaches, then the product is not perceived a state of the art. Mechanisms to improve model quality during operations of a product are thus a key building block for intelligent applications.

One issue that can affect quality of machine learned models is the inadvertent introduction of bias into a machine learned model and a self-reinforcing process where that bias is repeated and augmented, causing a reduction in reliability of the model to provide accurate results, such as accurate predictions.

One of example of this is in item recommendation systems. In such systems, users who are interested in obtaining, using, or otherwise interacting with items, such as physical items for sale in an online marketplace, are presented with one or more recommendations indicating what a machine learned model "thinks" the user may be interested in. These models may be trained using a variety of different input data, such as a user's profile, past purchasing behaviors, browsing history, etc. An issue that arises, however, is that if past purchasing behavior and browsing history are given a high level of importance in these models, then a self-reinforcing loop can be introduced where the user is constantly presented with recommendations based on their past actions, and then therefore is likelier to purchase items in line with their past actions because those items are the ones being recommended. For example, a user who recently purchased an older home may visit an online bookseller and purchase a number of books on home repair. Based on these past actions, the recommendation system may recommend additional books on home repair, in lieu of recommending additional books on other subjects. Because the user is then only presented with books on home repair, and thus subsequent purchases may be biased towards books on home repair, the system may essentially never learn that the user has other interests and would never recommend books on other interests that the user may very well have preferred.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
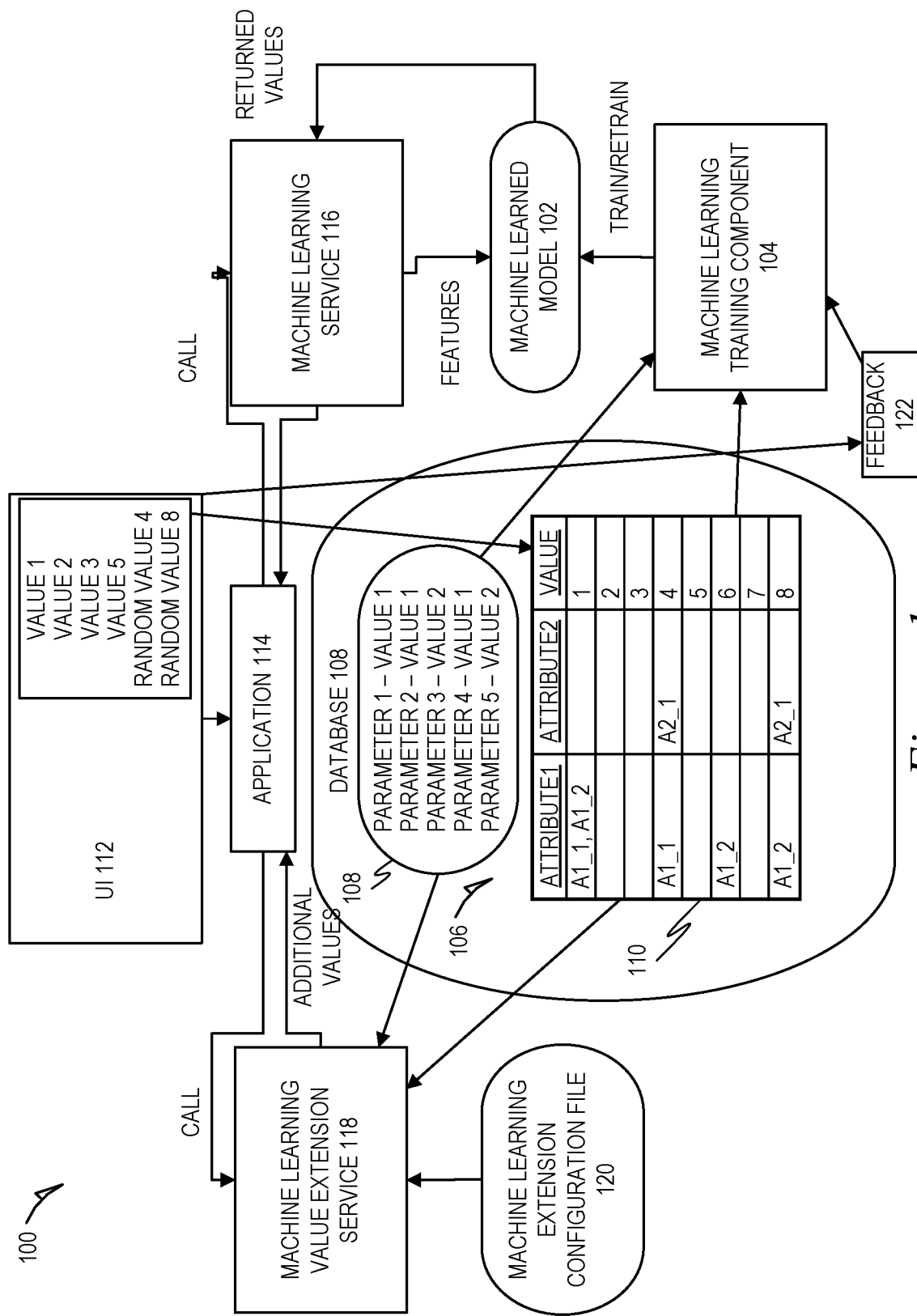
FIG. 1 is a block diagram illustrating a system for improving sensitivity in supervised machine learning in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a process in introduced into a machine learned model where additional results are output by the machine learned model in addition to those results that would be obtained through use of the trained model itself. In some example embodiments, these additional results may be random or semi-random to introduce results that might otherwise not have been recommended by the machine learned model. By introducing such additional results in a controlled way, it becomes possible to reduce biases caused by a self-reinforcing feedback loop while still presenting users with accurate machine learned model results.

Specifically, a process to control the additional results is introduced as well as to measure the feedback from these additional results, as well as to bring the usage of these additional results back into the machine learning training process.

In an example embodiment, the machine learned mode is a recommendation system. In a recommendation system, a machine learning algorithm is used to train a machine learned model on training data to perform a prediction of the likelihood a user will be interested in a particular item (in a sales-based model, this interest will be reflected in the user purchasing the item, but other types of recommendation systems can be trained to reflect other types of user interest, such as selection of an item, saving an item, sharing an item, etc.). This model then maybe used to evaluate each item in a set of potential items to recommend. The potential items to recommend that have the highest score output by this model are the one the model thinks the user are likeliest to have interest in, and are then recommended. It should be noted that these items may be physical items or other items for sale, but also could be non-physical items or items not for sale, such as online content that may be of interest to a user, or applications the user may wish to run.

In an example embodiment, the additional results are introduced as random or semi-random items included in the list of recommended items. Since over-recommendation of such random or semi-random items may "ruin" the experience of a recommendation (because such recommendations may be completely different than what the user may be interested in or ever have expressed interest in), in example embodiments the percentage of recommended items that are these random or semi-random items may be low in comparison to the percentage of recommended items that are based on the output of the machine learned model. For example, 10% of the recommended items will be ones that are recommended due to random or semi-random selection rather than the corresponding score of the machine learned model.

In another example embodiment, rather than purely random items being recommended, a number of different selection criteria may be applied to items to make it more likely that the user will be interested in the item, without sacrificing the anti-bias aspect of the technique. These criteria may include, for example, similar price to items recommended by the machine learned model, similar item domain to items recommended by the machine learned mode, similar region to items recommended by the machine learned mode, etc. Additionally, the additional items may be limited to items not already recommended to the user, or not recommended to the user within a preset period of time. This would allow items that the user is clearly not interested in to be removed the pool of potential items to recommend.

The additional items recommended in addition to those recommended using the machine learned model itself may be termed as being recommended as part of a "proposal-evaluation-retraining-loop."

Additionally, items being recommended as part of the proposal-evaluation-retraining-loop may be different for different users. Thus, with a large number of users and requests for recommended items to the system, a broad range of potentially false-negative entities are shown to at least one user, which as will be seen helps in retraining the machine learned model in subsequent iterations to reduce the bias.

Items recommended as part of the proposal-evaluation-retraining-loop may be tagged in a follow-up process so special treatment can be added. If the user classifies one of the tagged items as a valuable recommendation (either explicitly, such as by purchasing or selecting on the item, or implicitly, such as by viewing an item for sale for an extended period or sharing the item with another user), such an event may be recorded. Also recorded may be a version number of the machine learned model at the time the item was recommended as part of the proposal-evaluation-retraining loop. This information can then be used to analyze and/or retrain the model. For example, the machine learned model can then be retrained into a new model and then the new model tested against a set of conditions present when the item was recommended as an additional item rather than as an item recommended by the previous version of the model itself, to determine whether the changes between the old version of the model and the new version of the model would cause the additional item to be recommended under the same conditions as part of the model itself, as opposed to having had to be inserted as a random or semi-random addition to the results of the model. Additionally, statistical information on the size of the sets can be collected from the system and made available for analysis. These sets may include, for example, the number of items shown as "recommended", the number of items shown as "random," the number of items in the database to select from, and the configuration of the semi-random criteria described above.

Regardless of how it is accomplished, in an example embodiment the user classification of one of the additional items recommended is iterated through to train the next version of the model. This helps ensure that the false negative entities are correctly classified as positives in the training process. The weights of the model can then be changed to optimize the results.

In some example embodiments, an additional user feedback channel can be added to obtain additional input for the training process. For example, the user may be asked for an assessment of the best and worst items, or an assessment of a certain number of recommended items individually. If a user, for example, assesses a random list of recommended items as "good", this feedback can be used to weight such items higher in future iterations of the model.

FIG. 1 is a block diagram illustrating a system 100 for improving sensitivity in supervised machine learning in accordance with an example embodiment. System 100 may include a machine learned model 102 that may be trained by a machine learning training component 104 to output a prediction of a likelihood that a user will interact with a recommended value if recommended. In this context, the term "value" is any value that is or represents something that can be selected or interacted with in some way in a graphical user interface, such as an item for sale (which can be, for example, viewed or purchased), or a piece of digital content (which can be, for example, selected, downloaded, commented on, or shared). Digital content may be a good for sale, such as a streaming movie, or may simply be information, such as an online article, application to run, resume of a job applicant, details about a job listing, etc.

The machine learning training component 104 may utilize training data 106 stored in a database 108 to train the machine learned model 102 using a machine learning algorithm. The machine learning algorithm may be selected from among many different potential supervised machine learning algorithms. Examples of supervised machine learning algorithms include artificial neural networks, Bayesian networks, instance-based learning, support vector machines, random forests, linear classifiers, quadratic classifiers, k-nearest neighbor, decision trees, and hidden Markov models.

The training data 106 may initially contain a series of parameters with the corresponding selected values of database 108. Each parameter may be, for example, a different instance of an interaction with a selected value. Thus, in the example in FIG. 1, the user may have selected value 1 at parameter 1, and also selected value 1 at parameter 2. The training data 106 may also contain more fine grained information about the interacted—with values, such an application data table 110 containing information about what attributes each value has. Here, for example, value 1 has a value of AT_1 for attribute 1 and no values for attribute 2, while Value 2 has a value of AT_2 for attribute 1 and a value of A2_2 for attribute 2. As will be seen later, this will be useful in recommending semi-random value constrained by attribute filters to improve accuracy.

Training the machine learned model may comprise extracting one or more features from the training data 106. Each feature may be a different attribute of the training data 106, and the selection of features can vary greatly depending upon the form of the training data 106. In some instances additional features can be calculated based on the extracted features. A machine learning algorithm then uses all the features as input to train the machine learned model. The training process involves the machine learning algorithm one or more weights, with each weight being a coefficient applied to a different input feature. The result of the training process is a model having variables for the features and optimized weights for the coefficients for the variables. A candidate value may then be evaluated by the machine learned model by obtaining features about the candidate value and inputting these features to the machine learned model, causing the machine learned model to apply the optimized weights to the features to output a score reflecting a prediction.

A user interface 112 permits a user to interact with an application 114 on which recommended values will be displayed. Specifically, when the user interacts with the user interface 112 in such a way as to necessitate recommendation of values, the application 114 makes a call to a machine learning service 116. For example, it may be common when a user is browsing items or searching for items in an online marketplace for the system to have an area of the display devoted to recommended items. When the user navigates the user interface to indicate the browsing or searching for items, the application 114 may make the call to the machine learning service. The machine learning service 116 coordinates identification of potential values to recommend and then evaluation of each of these potential values using the machine learned model 102. It may then rank the potential values based on the evaluations of the potential values using the machine learned model 102. For example, the machine learned model may produce a score between 0 and 100 indicating the predicted user interest in the evaluated value. The machine learning service 116 may rank the proposed values using these scores and then display the top N scoring potential values to the user on the application 114. N may be based on, for example, the size of the available display area to display recommendations. In some example embodiments, for example, if the application 114 is running on a mobile device with a limited display, it may be desirable to set N low to reflect the lesser available display on most mobile devices, in contrast with a desktop or laptop device, which may have a higher N.

In an example embodiment, when the application 114 makes the call to the machine learning service 116, it also makes a call to a machine learning value extension service 118. It should be noted that these two calls need not be performed simultaneously or even contemporaneously with respect to time. It will suffice that both calls are made prior to the application displaying the top N scoring potential values because, as will be seen, the application will display values from the machine learning value extension service 118 interleaved with the top N scoring potential values from the machine learning service 116.

Upon receiving the call from the application 114, the machine value extension service reads a machine learning extension configuration file 120, which specifies how the extension service will select one or more additional values return to the application 114 for display. In a simple case, the machine learning extension configuration file 120 indicates to return completely random values. In more complex cases, the machine learning extension configuration file 120 indicates to filter random values based on the presence of one or more attributes. As such, when the machine learning value extension service 118 computes which values to return to the application 114 for display, it can utilize the application data table 110 to make this determination.

For example, the machine learning extension configuration file 120 may specify that the returned values should be ones that have values for attribute 1 that match prior interactions from the same user. In this case, the history of selected values in the series of parameters with the corresponding selected values of database 108 indicates that the user has selected value 1 and value 2 in the past. The application data table 110 indicates that value 1 has an attribute value of "A1_1" for attribute 1 and an attribute value of "A1_2" for attribute 1. Since values 1, 2, 3, and 5 have been previously displayed as having been recommended by the machine learned model, those values are not part of the potential set of additional values. Thus, the initial potential set of additional values would be values 4, 6, 7, and 8. Since the criteria specified for selection from these potential set of additional values indicate that only values for attribute 1 that match prior interactions from the same user, the machine value extension service 120 will return random values that contain either an attribute value of "A1_1" for attribute 1 or an attribute value of "A1_2" for attribute 1. In this case, that would be values 4, 6, and 8, so that random values from among values 4, 6, and 8 will be returned.

The machine learning extension configuration file 120 may also contain an indication of how many values the machine learning value extension service 118 should return with each call. This may be specified, for example, as a percentage of N. Thus, if the machine learning service were to return 4 values for display because N was set at 4, and the percentage was set to 50%, then the machine learning value extension service 118 would return 2 values for display (that matched the specified attributes, of course).

The machine learning value extension service 118 may select the random values from the set of all potential values. This may be specified, for example, in the application data table 110.

The machine learning value extension service 118 may be configured with the database source (table or view) to propose values for an input field on the user interface 112. It can be registered in the application 114 to provide additional values for the user interface 112.

Optionally, the machine learning value extension service 118 can also ensure a certain distribution of random values for different users, if random alone is not considered good enough.

At this stage, the application 114 has received some recommended values for display from the machine learning service 116 and some additional values for display from the machine learning value extension service 118. Thus, the application can then present the combination of these values to the user via the user interface 112. This combination may be displayed in a number of different ways. In one example embodiment, the recommended values from the machine learning service 116 are displayed higher on the display than the additional values from the machine learning value extension service 118. In another example embodiment, the machine learning value extension service may be inserted proportionally within the recommended values. For example, in this case there are 4 recommended values and 2 additional values, and in that case for every 2 recommended values one additional value can be displayed. As such, the top 2 recommended values can be displayed at the top, then one of the additional values, then the remaining 2 recommended values, then the final additional value. In other example embodiments, the additional values may be randomly placed among the recommended values.

Once the combination of the values are displayed via the user interface 112, the user may interact with one or more of the values, to either implicitly or explicitly provide feedback about the recommendations. The user may, for example, wind up purchasing or otherwise selecting one of the additional values from the machine learning value extension service 118 that the user might otherwise not have even seen if just the recommended values from the machine learning service 116 were displayed. In another example, the user may be asked to explicitly provide feedback about each displayed value, such as by rating each displayed value from one star to five starts based on the user's level of interest in each.

The user interface 112 therefore may be designed specifically to include elements to capture the user classification of selected items if this cannot be devised by normal user interface behavior. These additional elements may include, for example, the aforementioned star feedback system.

No matter the form of the feedback 122, the feedback may be stored by the database and included in the pipeline for training the machine learned model 102 by the machine learning training component 104. As such, subsequent iterations of the machine learned model 102 are adjusted based on feedback 122, potentially with that feedback 122 regarding values that would not have ordinarily been recommended by the previous iterations of the machine learned model 102. This helps reduce the bias caused by relying only on feedback from values that have actually been recommended by previous iterations of the machine learned model.

In an alternative system, the machine learned model 104 can be provided via access through a stored procedure in a database. In this case, the application 114 would call an Application Program Interface (API) in the database, which provides access to the machine learned model 104.

It should be noted that the above is just one example embodiment of how the system 100 may be organized. In other example embodiments, it is not necessary to have the machine learning service 116 and the machine learning value extension service 118 as separate services; they could be combined into a single service that performs both functions and returns the same combination of values.

Figure 2:
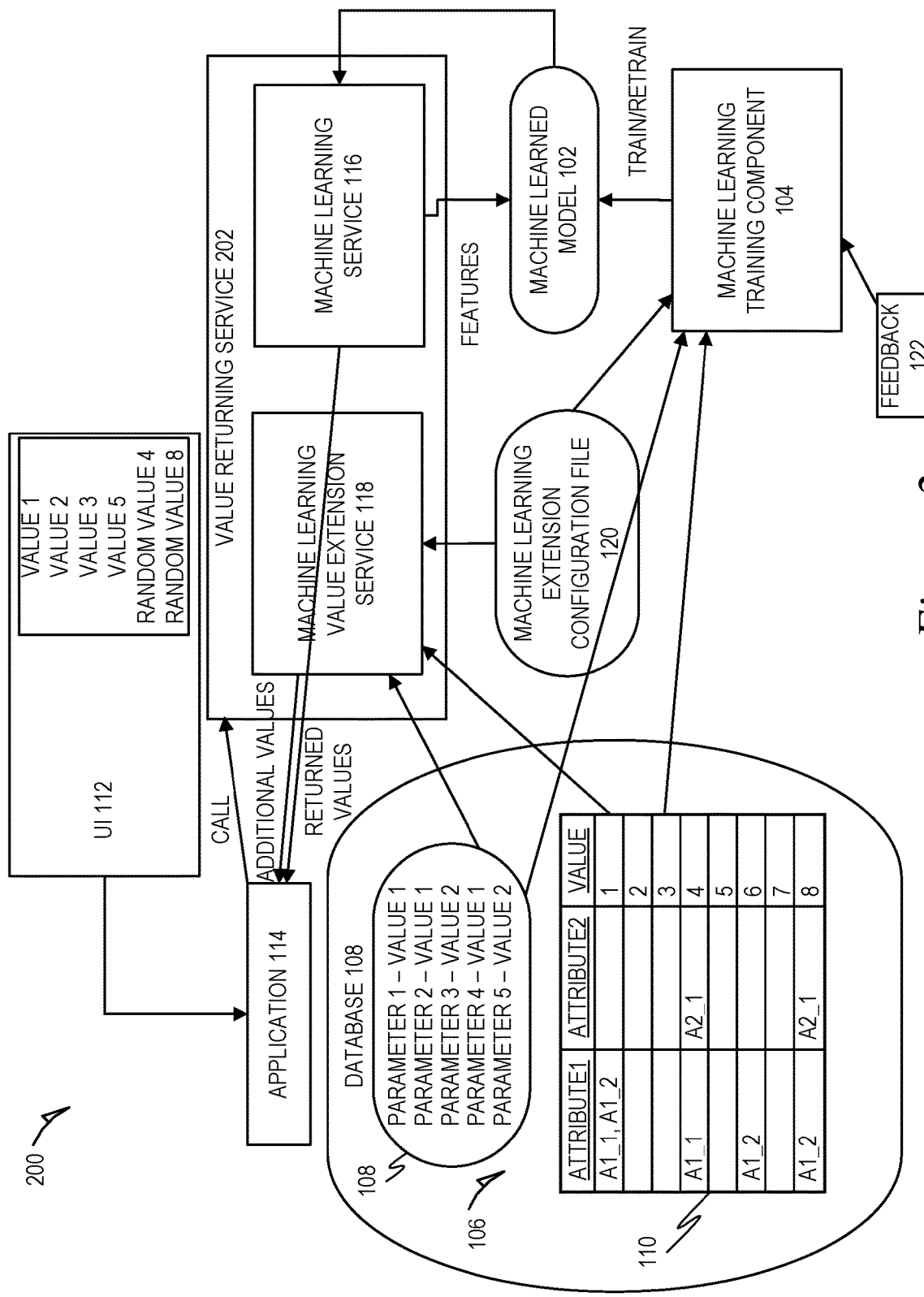
FIG. 2 is a block diagram illustrating a system for improving sensitivity in supervised machine learning in accordance with another example embodiment.

FIG. 2 is a block diagram illustrating a system 200 for improving sensitivity in supervised machine learning in accordance with another example embodiment. In this system 200, the machine learning service 116 and machine learning value extension service 118 are not completely separate services but are sub-services of a combined value returning service 202.

The level of interaction that would result in a displayed value could be integrated into the training pipeline of future iterations of a machine learned model that may vary based on the type of environment in which the interaction is recorded and the type of values involved. For example, if the values represent items for sale, purchase of the corresponding item might be considered the key interaction for a positive interaction with the value. In some instances, however, merely viewing the item such as by selecting the value to bring up a corresponding item listing might be enough. In other scenarios, neither purchase nor selection may be enough. For example, where the value represents a potential vendor of an item as opposed to the item itself, merely selecting to view the vendor or purchase of the item from the vendor may not be enough to represent a positive interaction with the value for training purposes. In that case, a key performance indicator (KPI), which is a measure of performance level in some numerically-measurable area, of the selected vendor, may be used as the positive interaction. In a sense, it may substitute for a star rating in cases where the KPI is available.

Figure 3:
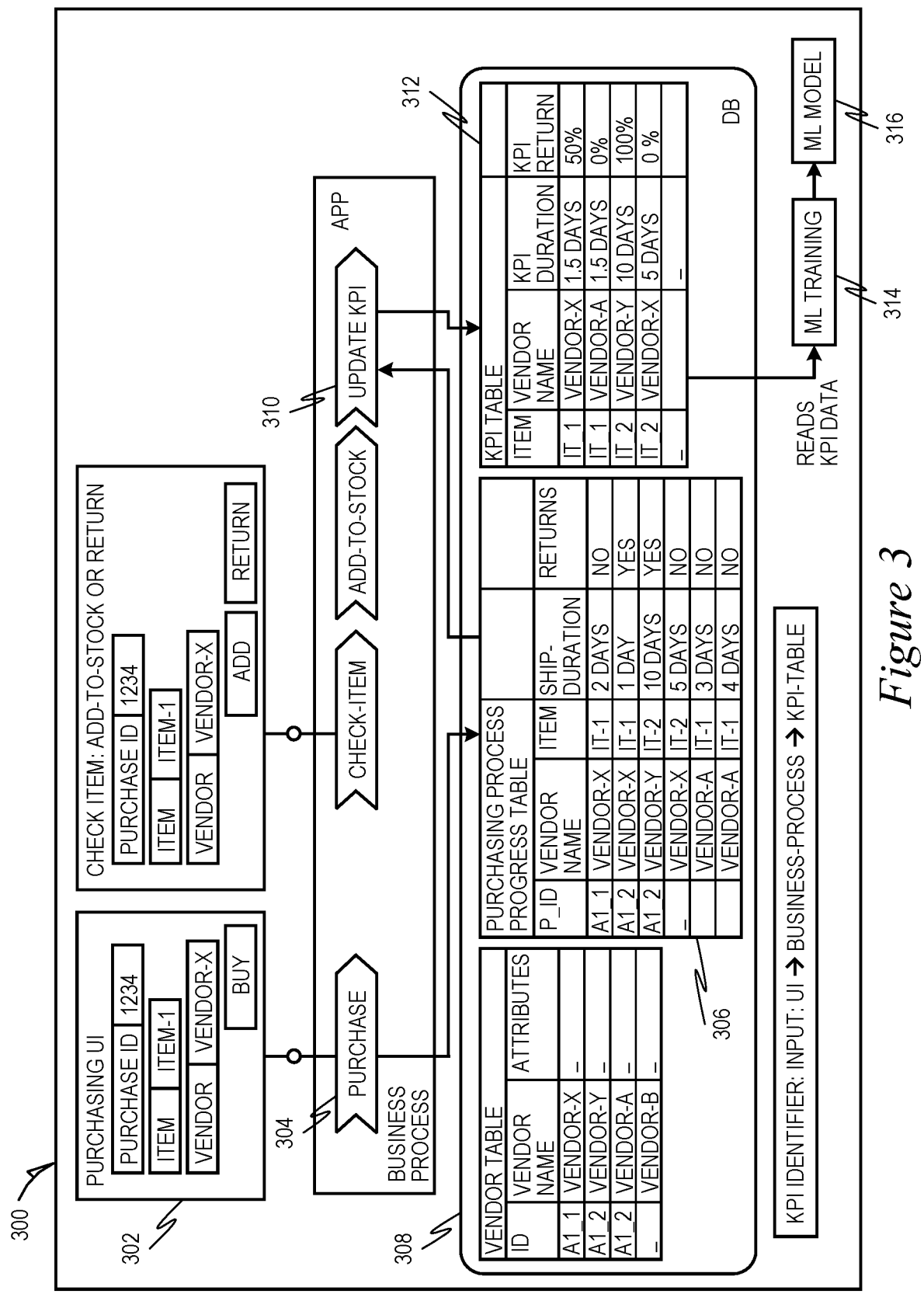
FIG. 3 is a diagram illustrating a system in an environment of business purchases, in accordance with an example embodiment.

FIG. 3 is a diagram illustrating a system 300 in an environment of business purchases, in accordance with an example embodiment. Here, a business-to-business purchaser may utilize a purchasing user interface (UI) 302 to make a purchase 304 of one or more items. This results in the purchase being tracked in a purchasing process progress table 306 in a database 308. An update KPI process 310 may then update one or more KPIs in a KPI table 312 in the database 308 based on the purchase. A machine learning training component 314 may then utilize the KPIs in training the machine learned model 316, which may then provide recommendations of items and additional times to the purchasing user interface 302 for display.

Similarly, if the value represents a job candidate, the positive interaction can be indicated at a variety of different levels, including viewing the candidate, contacting the candidate, interviewing the candidate, hiring the candidate, or job performance of the candidate This helps reinforce the notion that even a candidate who might not look ideal on paper might wind up being a top performer once hired, and thus the machine learned model can be trained to recognize which features of the candidate's resume (e.g., interests) might indicate a likelihood that the candidate will perform well in the job, despite not being strong in other more commonly used features of the candidate's resume (e.g., grades, school).

Figure 4:
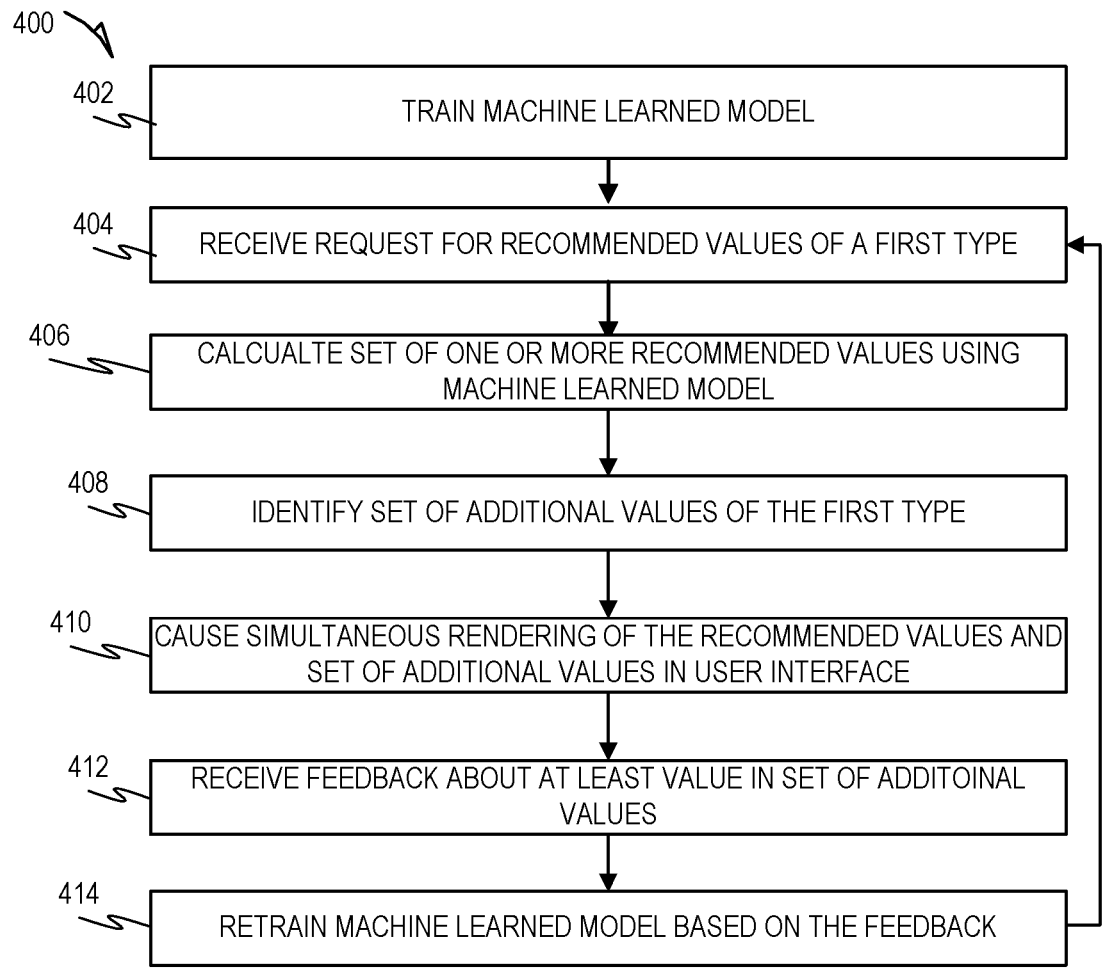
FIG. 4 is a flow diagram illustrating a method for improving sensitivity in supervised machine learning, in accordance with an example embodiment.

FIG. 4 is a flow diagram illustrating a method 400 for improving sensitivity in supervised machine learning, in accordance with an example embodiment. At operation 402, a machine learned model is trained using a machine learning algorithm, the training utilizing a first set of training data stored in a database. At operation 404, a request for recommended values of a first type for display in a first area of a user interface is received from the user interface. At operation 406, a set of one or more recommended values of the first type is calculated using the machine learned model.

At operation 408, a set of additional values of the first type is identified. This may be performed by selecting random values from a set of potential values. At operation 410, simultaneous rendering of the set of one or more recommended values of the first type and the set of additional values of the first type in the first area of the user interface is caused.

At operation 412, feedback about at least one value in the set of additional values is received. At operation 414, the machine learned model is retrained based on the feedback. The method 400 then loops back to operation 404, using the retrained machine learned model.

Examples

Example 1. A system comprising:
  at least one hardware processor; and
  a computer-readable medium storing instructions that, when executed by the at least one hardware processor, cause the at least one hardware processor to perform operations comprising:
    training a machine learned model using a machine learning algorithm, the training utilizing a first set of training data stored in a database;
    receiving, from a user interface, a request for recommended values of a first type for display in a first area of the user interface;

calculating, using the machine learned model, a set of one or more recommended values of the first type;

identifying a set of additional values of the first type;

causing simultaneous rendering of the set of one or more recommended values of the first type and the set of additional values of the first type in the first area of the user interface;

receiving feedback about at least one value in the set of additional values;

retraining the machine learned model based on the feedback; and repeating the calculating, identifying, causing, receiving, and retraining using the retrained machine learned model.

Example 2. The system of Example 1, wherein the set of additional values include only values randomly selected from a subset of possible values of the first type.

Example 3. The system of Example 2, wherein the subset of possible values of the first type include only values containing one or more attribute values matching preconfigured criteria for an attribute of values of the first type.

Example 4. The system of any of Examples 1-3, wherein the feedback includes positive interaction with the at least one value in the user interface.

Example 5. The system of any of Examples 1-4, wherein the feedback includes an explicit rating provided by a user, via the user interface, for each of the at least one value.

Example 6. The system of any of Examples 1-5, wherein the feedback includes a key performance indicator (KPI) related to each of the at least one value.

Example 7. The system of any of Examples 1-6, wherein the calculating is performed in response to receiving a first call from the user interface and wherein the identifying is performed in response to receiving a second call from the user interface.

Example 8. A method comprising:

training a machine learned model using a machine learning algorithm, the training utilizing a first set of training data stored in a database;

receiving, from a user interface, a request for recommended values of a first type for display in a first area of the user interface;

calculating, using the machine learned model, a set of one or more recommended values of the first type;

identifying a set of additional values of the first type;

causing simultaneous rendering of the set of one or more recommended values of the first type and the set of additional values of the first type in the first area of the user interface;

receiving feedback about at least one value in the set of additional values;

retraining the machine learned model based on the feedback; and repeating the calculating, identifying, causing, receiving, and retraining using the retrained machine learned model.

Example 9. The method of Example 8, wherein the set of additional values include only values randomly selected from a subset of possible values of the first type.

Example 10. The method of Example 9, wherein the subset of possible values of the first type include only values containing one or more attribute values matching preconfigured criteria for an attribute of values of the first type.

Example 11. The method of any of Examples 8-10, wherein the feedback includes positive interaction with the at least one value in the user interface.

Example 12. The method of any of Examples 8-11, wherein the feedback includes an explicit rating provided by a user, via the user interface, for each of the at least one value.

Example 13. The method of any of Examples 8-12, wherein the feedback includes a key performance indicator (KPI) related to each of the at least one value.

Example 14. The method of any of Examples 8-13, wherein the calculating is performed in response to receiving a first call from the user interface and wherein the identifying is performed in response to receiving a second call from the user interface.

Example 15. A non-transitory machine-readable medium storing instructions which, when executed by one or more processors, cause the one or more processors to perform operations comprising:

training a machine learned model using a machine learning algorithm, the training utilizing a first set of training data stored in a database;

receiving, from a user interface, a request for recommended values of a first type for display in a first area of the user interface;

calculating, using the machine learned model, a set of one or more recommended values of the first type;

identifying a set of additional values of the first type;

causing simultaneous rendering of the set of one or more recommended values of the first type and the set of additional values of the first type in the first area of the user interface;

receiving feedback about at least one value in the set of additional values;

retraining the machine learned model based on the feedback; and repeating the calculating, identifying, causing, receiving, and retraining using the retrained machine learned model.

Example 16. The non-transitory machine-readable medium of Example 15, wherein the set of additional values include only values randomly selected from a subset of possible values of the first type.

Example 17. The non-transitory machine-readable medium of Example 16, wherein the subset of possible values of the first type include only values containing one or more attribute values matching preconfigured criteria for an attribute of values of the first type.

Example 18. The non-transitory machine-readable medium of any of Examples 15-17, wherein the feedback includes positive interaction with the at least one value in the user interface.

Example 19. The non-transitory machine-readable medium of any of Examples 15-18, wherein the feedback includes an explicit rating provided by a user, via the user interface, for each of the at least one value.

Example 20. The non-transitory machine-readable medium of any of Examples 15-19, wherein the feedback includes a key performance indicator (KPI) related to each of the at least one value.

Figure 5:
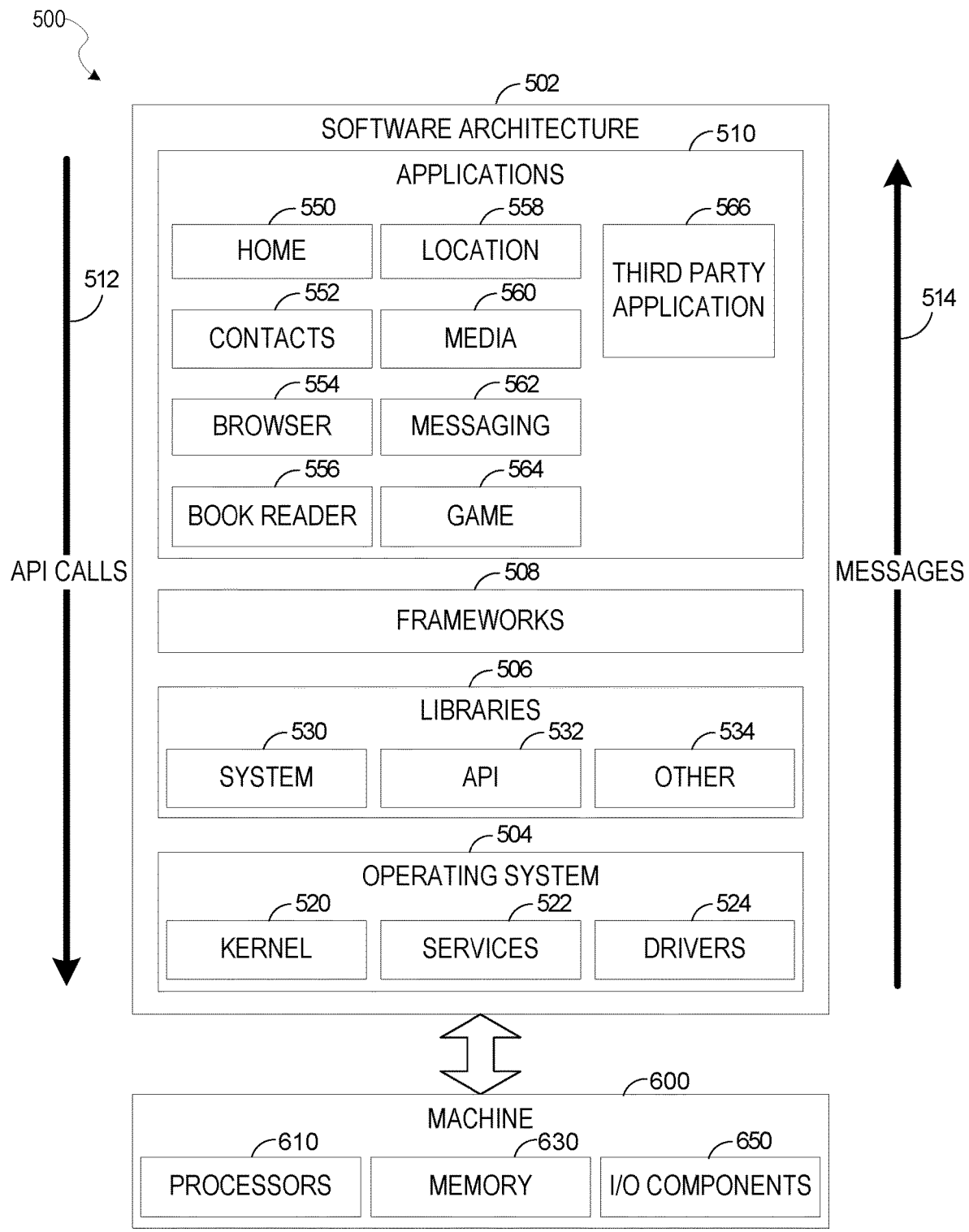
FIG. 5 is a block diagram illustrating an architecture of software, which can be installed on any one or more of the devices described above.

FIG. 5 is a block diagram 500 illustrating an software architecture 502, which can be installed on any one or more of the devices described above. FIG. 5 is merely a non-limiting example of a software architecture, and it will be appreciated that many other architectures can be implemented to facilitate the functionality described herein. In various embodiments, the software 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
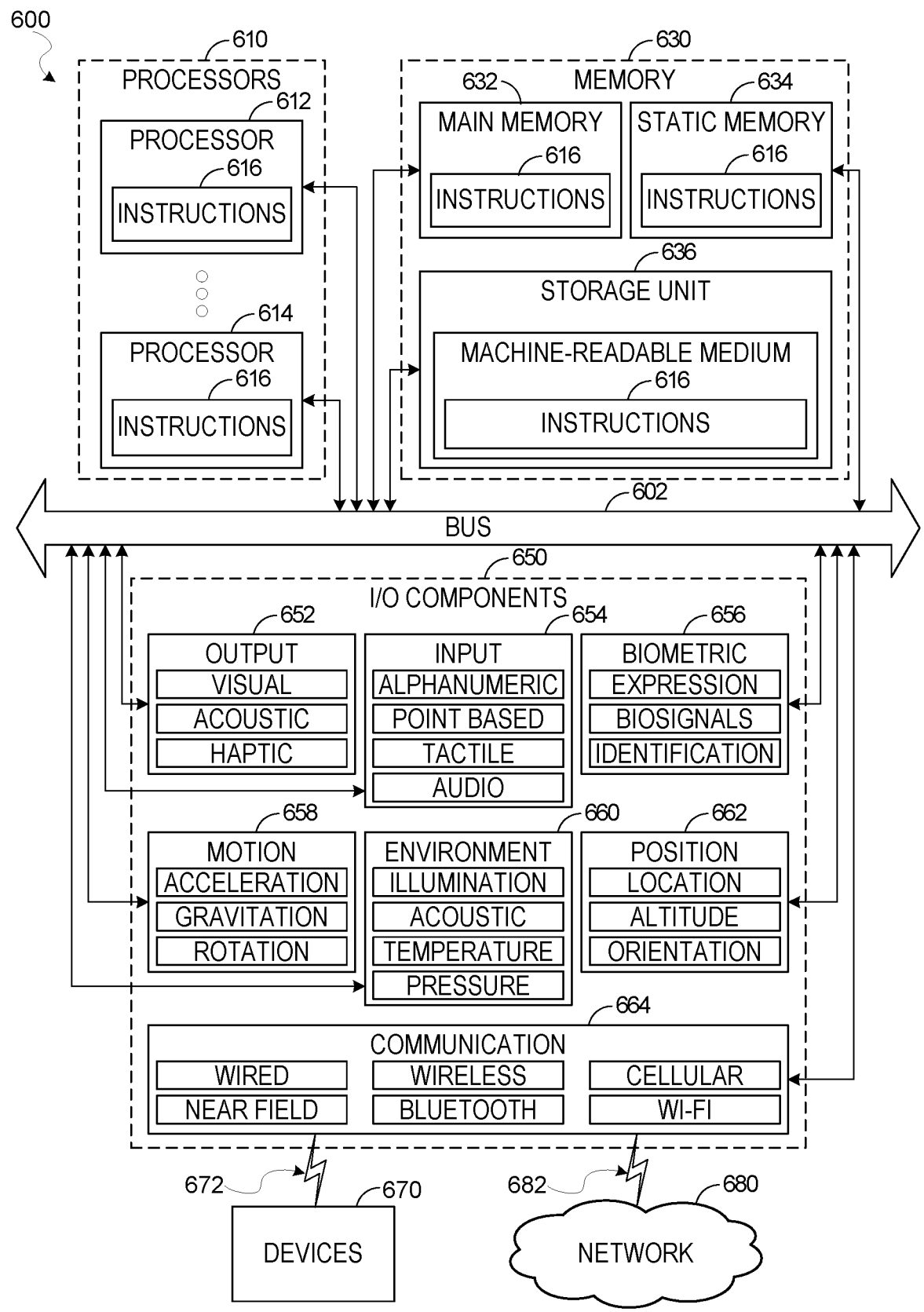
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the method 400 of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   training a machine learned model using a machine learning algorithm, the training utilizing a first set of training data stored in a database;
   receiving, via an application programming interface (API), a request from a component for recommended values of a first type, the request generated based on first user interaction with a user interface;
   calculating, using the machine learned model, a set of one or more recommended values of the first type;
   identifying a set of additional values of the first type;
   receiving feedback about at least one value in the set of additional values, the feedback having been generated based on second user interaction with the user interface;
   tagging the at least one value with a feedback event and an indication of a version number of the machine learned model that was in use at a time the feedback was received;
   retraining the machine learned model based on the feedback; and
   testing the retrained machine learned model against a set of conditions that was in place at the time the feedback was received, using the feedback event and indication of the version number of the machine learned model.

2. The system of claim 1, wherein the set of additional values include only values randomly selected from a subset of possible values of the first type.

3. The system of claim 2, wherein the subset of possible values of the first type includes only values containing one or more attribute values matching preconfigured criteria for an attribute of values of the first type.

4. The system of claim 1, wherein the feedback includes positive interaction with the at least one value in a user interface.

5. The system of claim 1, wherein the feedback includes an explicit rating provided by a user for each of the at least one value.

6. The system of claim 1, wherein the feedback includes a key performance indicator (KPI) related to each of the at least one value.

7. The system of claim 1, wherein the calculating is performed in response to receiving a first call from a user interface and wherein the identifying is performed in response to receiving a second call from the user interface.

8. A method comprising:
   training a machine learned model using a machine learning algorithm, the training utilizing a first set of training data stored in a database;
   receiving, via an application programming interface (API), a request from a component for recommended values of a first type, the request generated based on first user interaction with a user interface;
   calculating, using the machine learned model, a set of one or more recommended values of the first type;
   identifying a set of additional values of the first type;

receiving feedback about at least one value in the set of additional values, the feedback having been generated based on second user interaction with the user interface;

tagging the at least one value with a feedback event and an indication of a version number of the machine learned model that was in use at a time the feedback was received;

retraining the machine learned model based on the feedback; and testing the retrained machine learned model against a set of conditions that was in place at the time the feedback was received, using the feedback event and indication of the version number of the machine learned model.

9. The method of claim 8, wherein the set of additional values include only values randomly selected from a subset of possible values of the first type.

10. The method of claim 9, wherein the subset of possible values of the first type includes only values containing one or more attribute values matching preconfigured criteria for an attribute of values of the first type.

11. The method of claim 8, wherein the feedback includes positive interaction with the at least one value in a user interface.

12. The method of claim 8, wherein the feedback includes an explicit rating provided by a user for each of the at least one value.

13. The method of claim 8, wherein the feedback includes a key performance indicator (KPI) related to each of the at least one value.

14. The method of claim 8, wherein the calculating is performed in response to receiving a first call from a user interface and wherein the identifying is performed in response to receiving a second call from the user interface.

15. A non-transitory machine-readable medium storing instructions which, when executed by one or more processors, cause the one or more processors to perform operations comprising:

training a machine learned model using a machine learning algorithm, the training utilizing a first set of training data stored in a database;

receiving, via an application programming interface (API), a request from a component for recommended values of a first type, the request generated based on first user interaction with a user interface;

calculating, using the machine learned model, a set of one or more recommended values of the first type;

identifying a set of additional values of the first type;

receiving feedback about at least one value in the set of additional values, the feedback having been generated based on second user interaction with the user interface;

tagging the at least one value with a feedback event and an indication of a version number of the machine learned model that was in use at a time the feedback was received;

retraining the machine learned model based on the feedback; and testing the retrained machine learned model against a set of conditions that was in place at the time the feedback was received, using the feedback event and indication of the version number of the machine learned model.

16. The non-transitory machine-readable medium of claim 15, wherein the set of additional values include only values randomly selected from a subset of possible values of the first type.

17. The non-transitory machine-readable medium of claim 16, wherein the subset of possible values of the first type includes only values containing one or more attribute values matching preconfigured criteria for an attribute of values of the first type.

18. The non-transitory machine-readable medium of claim 15, wherein the feedback includes positive interaction with the at least one value in a user interface.

19. The non-transitory machine-readable medium of claim 15, wherein the feedback includes an explicit rating provided by a user for each of the at least one value.

20. The non-transitory machine-readable medium of claim 15, wherein the feedback includes a key performance indicator (KPI) related to each of the at least one value.

* * * * *